(12) United States Patent
Dykyj et al.

(10) Patent No.: US 8,707,491 B1
(45) Date of Patent: Apr. 29, 2014

(54) MULTI-FUNCTIONAL GARDENING IMPLEMENT

(71) Applicant: 2378807 Ontario Inc., Burlington (CA)

(72) Inventors: John Dykyj, Burlington (CA); John Askwith, Toronto (CA); Robert MacLeod, Smithville (CA)

(73) Assignee: 2378807 Ontario Inc., Burlington (CA)

( * ) Notice: Subject to any disclaimer, the term of this patent is extended or adjusted under 35 U.S.C. 154(b) by 0 days.

(21) Appl. No.: 14/061,493

(22) Filed: Oct. 23, 2013

(30) Foreign Application Priority Data

Aug. 8, 2013 (CA) ...................................... 2823161

(51) Int. Cl.
  *B26B 15/00* (2006.01)
  *B26B 13/00* (2006.01)
  *B25B 7/00* (2006.01)
  *B26B 11/00* (2006.01)
  *A01D 1/06* (2006.01)

(52) U.S. Cl.
  CPC . *B26B 13/00* (2013.01); *B25B 7/00* (2013.01); *B26B 11/00* (2013.01); *A01D 1/06* (2013.01)
  USPC .................................. 7/158; 172/374; 30/131

(58) Field of Classification Search
  CPC .......... B26B 13/00; B26B 11/00; B25B 7/00; A01D 1/00
  USPC .......................... 7/114–16, 158; 81/308–310; 172/371–375, 378
  See application file for complete search history.

(56) References Cited

U.S. PATENT DOCUMENTS

| 2,368,792 | A | * | 2/1945 | Willman | 42/94 |
| 4,476,939 | A | * | 10/1984 | Wallace | 172/374 |
| 5,185,930 | A | * | 2/1993 | Hamlin | 30/131 |
| 2012/0133163 | A1 | * | 5/2012 | Kavanagh et al. | 294/118 |

* cited by examiner

*Primary Examiner* — Monica Carter
*Assistant Examiner* — Melanie Alexander
(74) *Attorney, Agent, or Firm* — Kagan Binder, PLLC (57) ABSTRACT

A multi-functional gardening implement that, in some embodiments, functions as a pair of shears, a spade, a garden cultivator, a saw, a machete, a weeder and a rake. The implement comprises two shears that cooperate to cut vegetation placed between them when a user presses the handles of the shears together. The implement also has at least one appendage, which may be a shovel, a hoe, a garden cultivator, or another garden tool that is attached to the central portions of the shears and can be rotated to an operating position where the appendage is supported by the blades of the shears. The implement may have a second appendage that rotates in the opposite direction to a similar operating position against the other sides of the blades. In some embodiments, the cutting portions of the shears may be configured to define a spade blade in the closed position.

20 Claims, 10 Drawing Sheets

MULTI-FUNCTIONAL GARDENING IMPLEMENT

PRIORITY CLAIM

This application claims priority from Canadian Application having serial number 2,823,161, filed on Aug. 8, 2013, which is incorporated herein by reference in its entirety.

FIELD OF THE INVENTION

The present invention relates generally to gardening tools, and more particularly to multi-functional gardening tools.

BACKGROUND OF THE INVENTION

Gardening and landscaping have been performed by humans since the beginnings of modem civilization. Usually, gardening and/or landscaping requires multiple types of tools to perform a multitude of different tasks. Typically a gardener may pick up a trowel to dig, then use a cultivator to break up larger pieces of dirt and the like. The gardener may then have to use a different tool such as a saw or machete to break through root systems that are generally under the surface of the ground. If that doesn't work the gardener may have to resort to shears to cut and a rake to displace all the roots, leaves and the like. However, this requires the gardener to put down one tool and pick up another tool. This results in the gardener standing up, fetching another tool then kneeling down and resuming the work. This is time-consuming, tiring, may cause injury and can be frustrating for the gardener.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a multi-functional gardening implement having a pair of first and second shears and a first appendage. Each of the two shears has a cutting portion, a handle portion and a central portion rigidly attached to the cutting portion at one end and rigidly attached to the handle portion at the other end. The ends of the handle and cutting portions of each shear attached to the (opposite) ends of the central portion are referred to as the proximal ends of the handle and cutting portions. The other ends of the handle and cutting portions are referred to as distal ends. Each cutting portion has inner and outer edges, and upper and lower surfaces. The central portions of the shears are pivotally connected to each other so that the shears can be rotated about a pivot point between a closed position, in which the inner edges of the cutting portions are proximate to each other, and open positions in which the inner edges are spaced apart from each other. When the shears are in the closed position, the cutting portions define a longitudinal axis of the gardening implement. The cutting portions of the shears may be configured to define a spade blade in the closed position. The cutting portions may extend laterally outwardly from the longitudinal axis to define a spade blade in the closed position, each inner edge being spaced outwardly from the longitudinal axis when in the open position and the inner edges being in abutting relation adjacent the longitudinal axis when in the closed position The gardening implement also has a first appendage, which has a longitudinal axis and a proximal end pivotally attached to the central portion of at least one of the shears. The other end of the appendage is referred to as the distal end. A portion of the first appendage towards the distal end forms a first gardening tool. The first appendage can be rotated between an operating position in which the first gardening tool is proximate to the cutting portions of the shears when the shears are in the closed position, and a stowed position in which the first gardening tool is spaced apart from the cutting portions, typically at a near maximal distance from the cutting portions.

The longitudinal axis of the first appendage may be substantially aligned with the longitudinal axis of the gardening implement when the shears are in the closed position and the first appendage is in the operating position.

The inner edge of one of the cutting portions may be a cutting blade and the inner edge of the other cutting portion may be an anvil, so that when the shears are in the closed position, a portion of the lower surface of the cutting portion having the cutting blade is above and proximate to a portion of the upper surface of the cutting portion having the anvil.

The inner edges of the cutting portions of the shears may cut plant matter when the plant matter is placed between the inner edges when the shears are in one of the open positions and the shears are then rotated into the closed position, which may be done by a user pushing the handle portions towards each other.

The first appendage may be constrained so that the longitudinal axis of the first appendage is substantially aligned with the longitudinal axis of the gardening implement, meaning that the longitudinal axis of the appendage generally remains in a plane normal (perpendicular) to the upper and lower surfaces of the cutting portions and through the longitudinal axis of the implement.

The handle portions of the shears may be sized and spaced apart from each other so the shears can be operated by a user by the user gripping one handle portion with one hand and gripping the other handle portion with the other hand. The handle portions may be at least 100 mm long and the distal ends of the handle portions may be spaced apart by at least 100 mm when the shears are in the closed position.

The first gardening tool may be a shovel blade, a hoe blade, a garden cultivator claw, or another garden tool.

The gardening implement may include a second appendage, which also has a longitudinal axis. The proximal end of the second appendage may be pivotally attached to the central portion of one or both shears. The other end of the second appendage is referred to as the distal end. A portion of the second appendage towards the distal end may form a second gardening tool. The second appendage may be rotatable between an operating position in which the second gardening tool is proximate to the cutting portions of the shears when the shears are in the closed position, and a stowed position in which the second gardening tool is spaced apart from the cutting portions, typically at a near maximal distance from the cutting portions.

The second gardening tool may be a shovel blade, a hoe blade, a garden cultivator claw, or another garden tool.

The second appendage may be constrained so that the longitudinal axis of the second appendage is substantially aligned with the longitudinal axis of the gardening implement.

The first and second appendages may rotate in opposite directions when moving from the stowed position to the operating position so that either of the appendages can be rotated from its stowed position to its operating position while the other appendage is in its stowed position.

The gardening implement may also include a rake component positioned inside the handle portion of one of the shears. The rake component may have a plurality of tines and be slidable from a stowed position, in which the rake component is maintained substantially inside the handle portion, to an operating position in which the tines extend out from the distal end of the handle portion. There may be a rake component positioned inside each of the handle portions. The tines may biased to separate from each other when the rake components are in the operating position so that when the rake components are in the operating position, the gardening implement can be used as a rake with a handle corresponding to the central portions of the shears.

The outer edge of the cutting portion of either or both of the shears may be a saw blade or a knife blade, or other cutting instrument. The saw blade may be a crosscut saw blade.

The distal end of each cutting portion may have a pointed tip so that when the shears are in the closed position, the tips form an integral weeding tool.

The central portions of the shears may be contoured to serve as a hand grip when the shears are in the closed position.

When the first appendage is in the operating position and the shears are in the closed position, the first gardening tool may abut either the upper surfaces or the lower surfaces of the cutting portions so that the cutting portions provide support to the first gardening tool. The first gardening tool may have a recess configured to receive the cutting portions of the shears when the shears are in the closed position. The recess may engage the cutting portions of the shears in a snap fit.

When the shears are in the closed position and the first appendage is in the operating position, the first gardening tool may abut either the upper surfaces or the lower surfaces of the cutting portions so that the cutting portions provide support to the first gardening tool, and when the shears are in the closed position and the second appendage is in the operating position, the second gardening tool may abut the opposite surfaces of the cutting portions so that the cutting portions provide support to the second gardening tool.

When the first appendage is rotated to the operating position, the first appendage may be locked in the operating position. The implement may include a detent that locks the first appendage in the operating position.

When the first appendage is rotated to the stowed position, the first appendage may be locked in the stowed position.

The appendages may be removable from the gardening implement so that either one or both appendages can be removed and replaced with another appendage.

Each shear may also have a stop attached to the proximal end of the cutting portion and extending laterally from the cutting portion, for example extending perpendicularly from the longitudinal axis of the implement when the shears are in the closed position.

The present invention also provides a multi-functional gardening implement extending along a longitudinal axis including a pair of garden shears and multiple gardening tools operatively connected with the garden shears along the longitudinal axis. The shears include a pair of opposed shear blades, each blade extending from a corresponding shear handle, the garden shears extending along the longitudinal axis, the shear blades extending toward a distal end of the longitudinal axis, and each shear handle extending toward a proximate end of the longitudinal axis. The gardening tools move between a stowed position to inhibit interference with the operational use of the garden shears or another gardening tool within said plurality of gardening tools, and an extended position along the longitudinal axis for operational use of the gardening tool. A first gardening tool abuts against the garden shears to inhibit deflection of the first gardening tool during operational use in its extended position.

The present invention further provides embodiments where the cutting portions of the shears act as an integral spade blade when they are in the closed position. The multi-functional gardening implement extending along a longitudinal axis has two opposed shears. Each shear has a cutting portion, a handle portion and a central portion therebetween. The handle portions and cutting portions of each shear extend pivotably outwardly from the central portion. The cutting portions have opposed inwardly facing inner edges pivoting between a closed position in which the edges are in abutting relation and an open position which the edges are in spaced apart relation. The cutting portions are configured to define a spade blade in the closed position. The cutting portions may extend laterally outwardly from the longitudinal axis to define a spade blade in the closed position, each inner edge being spaced outwardly from the longitudinal axis when in the open position and the inner edges being in abutting relation adjacent the longitudinal axis when in the closed position. The cutting portion of each shear may have a lateral width of at least 50 mm.

The gardening implement with integral spade blade may also include a first appendage having a longitudinal axis, a proximal end pivotally attached to the central portion of at least one of the shears and a distal end, a portion of the first appendage towards the distal end comprising a first gardening tool. The first appendage may be rotatable between an operating position in which the first gardening tool is proximate to the cutting portions of the shears when the shears are in the closed position, and a stowed position in which the first gardening tool is spaced apart from the cutting portions. The longitudinal axis of the gardening implement may be substantially aligned with the longitudinal axis of the first appendage when the shears are in the closed position and the first appendage is in the operating position. The inner edge of one of the cutting portions may be a cutting blade and the inner edge of the other cutting portion may be an anvil, and, in the closed position, a portion of the lower surface of the cutting portion comprising the cutting blade may be located above and proximate to a portion of the upper surface of the cutting portion comprising the anvil. The inner edges of the cutting portions of the shears may be configured to cut plant matter when the plant matter is placed between the inner edges when the shears are in one of the open positions and the shears are then rotated into the closed position.

The first appendage of the gardening implement with integral spade blade may be constrained to rotate vertically so that the longitudinal axis of the first appendage is maintained in a plane normal to the surfaces of the cutting portions near the inner edges when the shears are in the closed position, the plane passing through the longitudinal axis of the gardening implement. The handle portions of the shears may be sized and spaced apart from each other so the shears are operable by a user gripping one handle portion with one hand and gripping the other handle portion with the user's other hand. The handle portions may be at least 100 mm long and the distal ends of the handle portions may be spaced apart by at least 100 mm when the shears are in the closed position. The first gardening tool is a hoe blade or may be a garden cultivator claw.

The gardening implement with integral spade blade may also have a second appendage having a longitudinal axis, a proximal end pivotally attached to the central portion of at least one of the shears, and a distal end, a portion of the second appendage towards the distal end comprising a second gardening tool. The second appendage may be rotatable between an operating position in which the second gardening tool is proximate to the cutting portions of the shears when the shears are in the closed position, and a stowed position in which the second gardening tool is spaced apart from the cutting portions. The second gardening tool may be a garden cultivator claw or a hoe blade. The second appendage may be constrained to rotate vertically so that the longitudinal axis of the second appendage is maintained in a plane normal to the surfaces of the cutting portions that passes through the longitudinal axis of the gardening implement. The first and second appendages may rotate in opposite directions when moving from the stowed position to the operating position so that either of the appendages can be rotated from its stowed position to its operating position while the other appendage is in its stowed position.

The gardening implement with integral spade blade may also have a rake component disposed inside the handle portion of one of the shears, the rake component comprising a plurality of tines and being slidable from a stowed position, in which the rake component is maintained substantially inside the handle portion, to an operating position in which the tines extend out from the distal end of the handle portion. A rake component may be disposed inside each of the handle portions. The tines may be biased to separate from each other when the rake component is in the operating position so that when the rake component is in the operating position, the gardening implement is operable as a rake with a handle corresponding to the central portions of the shears.

Each cutting portion of the gardening implement with integral spade blade may have an outer edge, and the outer edge of the cutting portion of one of the shears may be a saw blade. Each cutting portion may have an outer edge, and the outer edge of the cutting portion of one of the shears may be a knife blade. Each cutting portion may have an outer edge, and the outer edge of the cutting portion of one of the shears may be a saw blade and the outer edge of the cutting portion of the other shear may be a knife blade. The saw blade may be a crosscut saw blade. The central portions of the shears may be contoured to serve as a hand grip when the shears are in the closed position.

When the shears are in the closed position and the first appendage is in the operating position, the first gardening tool may abut either the upper surfaces or the lower surfaces of the cutting portions so that the cutting portions provide support to the first gardening tool. When the shears are in the closed position and the first appendage is in the operating position, the first gardening tool may abut either the upper surfaces or lower surfaces of the cutting portions so that the cutting portions provide support to the first gardening tool, and when the shears are in the closed position and the second appendage is in the operating position, the second gardening tool may abut the opposite surfaces of the cutting portions so that the cutting portions provide support to the second gardening tool. When the first appendage is rotated to the operating position, the first appendage may be locked in the operating position.

The gardening implement with integral spade blade may also include a detent that locks the first appendage in the operating position. It may also include a releasable lock to lock the cutting portions in the closed position. When the first appendage is rotated to the stowed position, the first appendage may be locked in the stowed position. The first appendage may be removable from the gardening implement so that the first appendage can be removed and replaced with another appendage.

BRIEF DESCRIPTION OF THE DRAWINGS

FIGS. 5a-5d show the gardening implement of FIG. 1 with the shovel in varying positions.

FIGS. 6a-6d show the gardening implement of FIG. 1 with the cultivator in varying positions.

FIGS. 7a and 7b show side views of the gardening implement of FIG. 1 with the cultivator and shovel in stowed positions. FIG. 7a shows the rake components in the stowed position and FIG. 7b shows the rake components in the operating position.

FIGS. 12a-12c show the gardening implement of FIG. 8 with the cultivator and rake in varying positions.

To better illustrate the depicted embodiments, the handle portions, central portions and cutting portions in FIGS. 1-4, 5b-5d, 6b-6d, 7, 8, 11 and 12 are depicted as being transparent so that elements interior to them or beneath them can be seen.

DETAILED DESCRIPTION OF THE INVENTION

Figure 1:
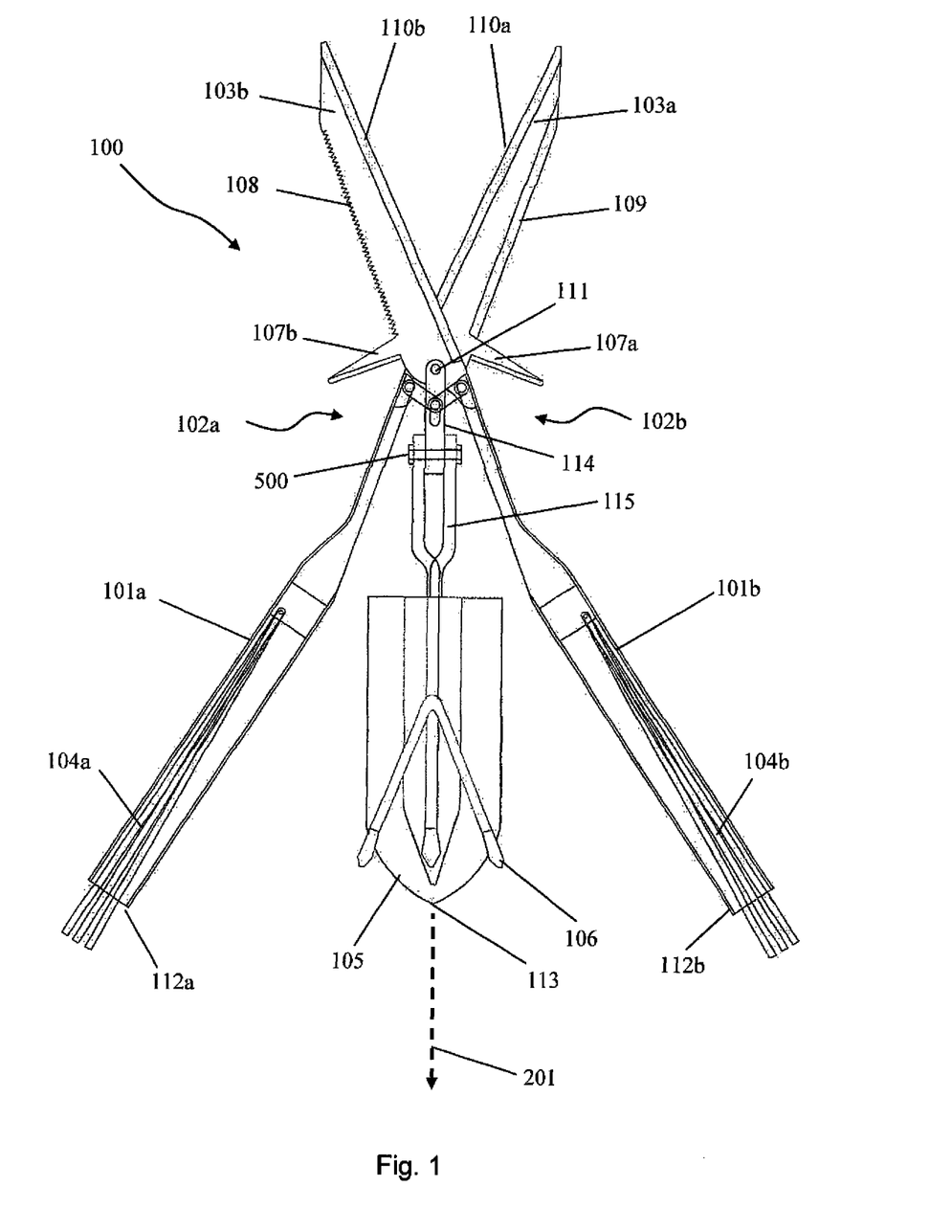
FIG. 1 shows a plan view of a first embodiment of a gardening implement with the shears in an open position, the shovel in the stowed position, the cultivator in the stowed position, and the rake components in the stowed position.

A preferred embodiment of the invention is depicted in FIGS. 1-3 and 5-7. FIG. 1 shows a plan view of a multi-functional garden implement 100 that functions as a pair of shears, a spade, a garden cultivator, a saw, a machete, a weeder and a rake. Preferred embodiments function as a pair of shears and at least one of a spade, a garden cutivator or a hoe, and more preferably two of the latter three tools. The multi-functional garden implement 100 provides numerous advantages over the prior art. It is fundamentally easier to store and use than several separate tools that perform the same functions. For example, the user may use several of the integrated tools of the multi-functional garden implement 100 while remaining in a kneeling position without having to move around to obtain other tools. Because of the sharing of components, it is also generally significantly less expensive to manufacture than separate tools required to perform all the functions performed by the multi-functional garden implement 100.

Figure 2:
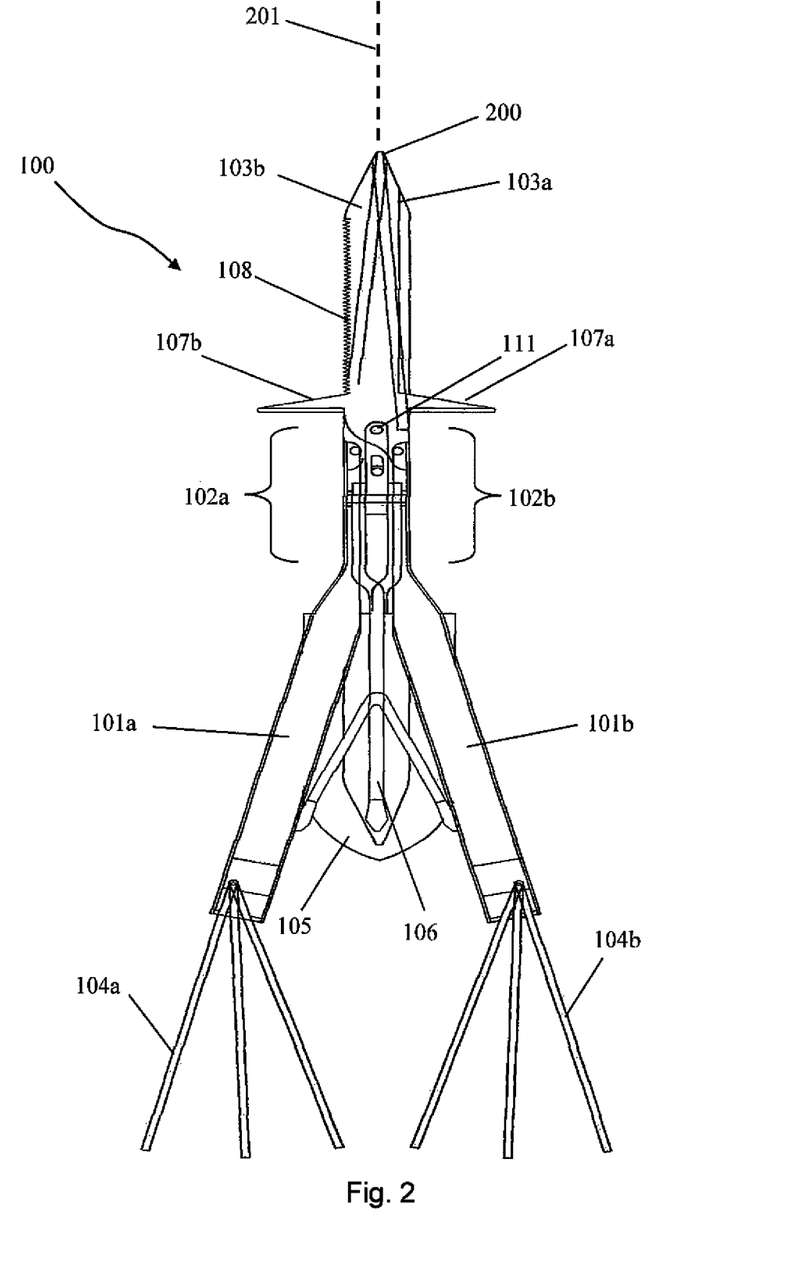
FIG. 2 shows a plan view of the gardening implement of FIG. 1 with the shears in the closed position, the shovel in the stowed position, the cultivator in the stowed position, and the rake components in the operating position.
Figure 3:
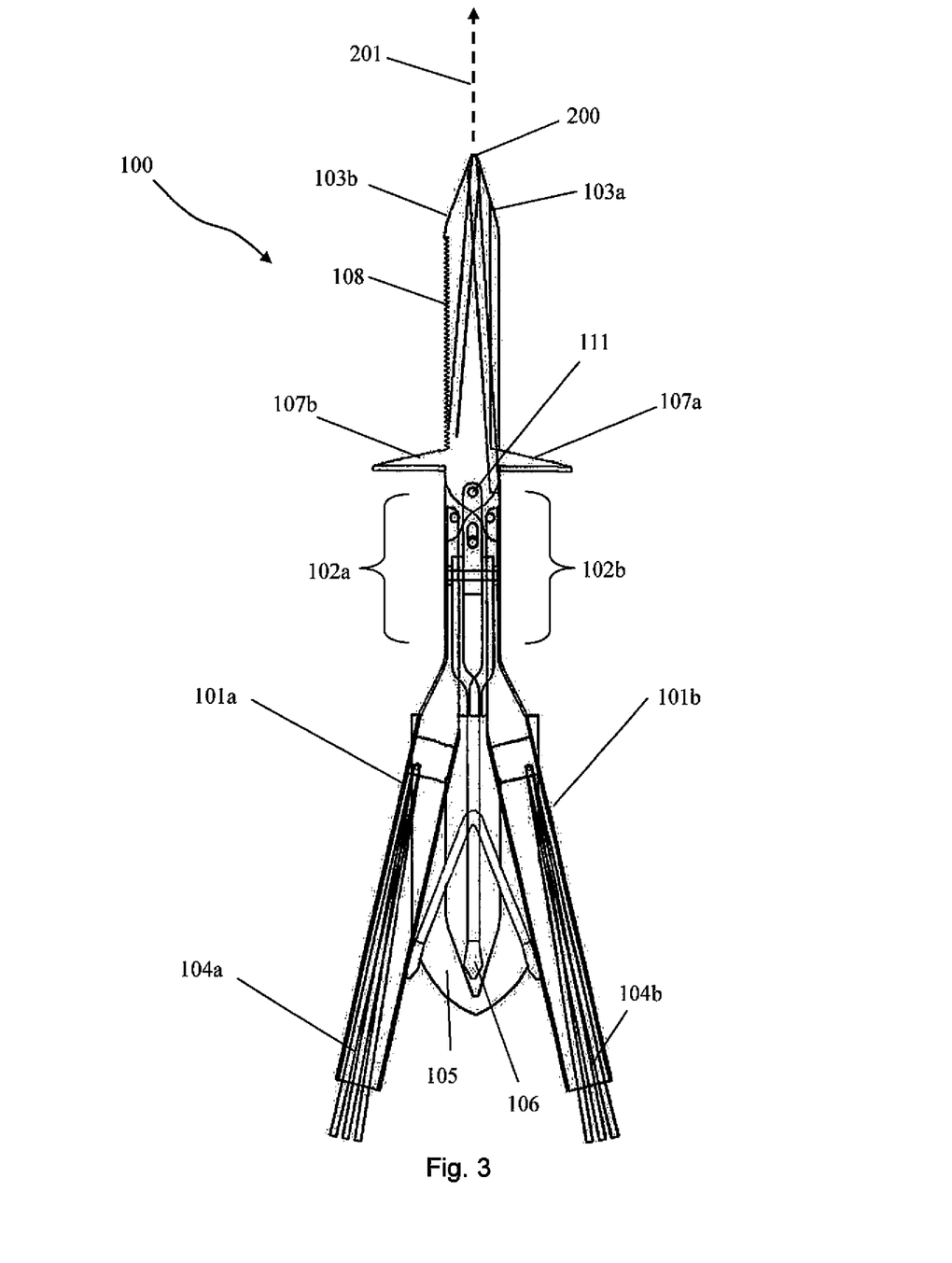
FIG. 3 shows a plan view of the gardening implement of FIG. 1 with the shears in the closed position, the shovel in the stowed position, the cultivator in the stowed position, and the rake components in the stowed position.

The implement 100 has two shears, each shear having three portions that are rigidly attached to each other: a handle portion 101, a central portion 102, and a cutting portion 103. The cutting portion 103 may also be referred to as a blade. In the figures, the portions of one shear (shear a) are marked as 101a, 102a and 103a, and the corresponding portions of the other shear (shear b) are marked as 101b, 102b and 103b. Note that when the "a" and "b" are omitted from a reference number, the reference is intended to refer to both, so a reference to "103" is equivalent to a reference to "103a, 103b". The lengths of each portion of each shear are generally the same for shear a as for shear b. The handle portions 101 each have a distal end 112, being the end of the handle portion 101 furthest from the cutting portion 103, and a proximal end, being the end rigidly attached to the central portion 102. The shears are pivotally connected to each other at a pivot point 111 so that the shears can rotate about the pivot point 111 to move between an open position, such as that shown in FIG. 1, and a closed position, as depicted in FIGS. 2 and 3 where the cutting portions 103 are parallel to each other and generally overlap somewhat. In one of the open positions, the inner edges 110 of the cutting portions 103 are spaced apart so that, for example, plant material may be placed between them (or the implement may be moved to a position such that such plant material is positioned between the inner edges 110). Examples of such plant material include grass and branches with a diameter sufficiently small to fit between the cutting portions 103, and cutable by the inner edges 110.

Each of the handle portions 101 is sized and spaced apart from each other sufficiently that a user can grasp one handle portion 101a in one hand and the other handle portion 101b in the other hand. The handle portions 101 generally are straight and at an angle relative to the central portions 102 and the longitudinal axis 201 so that they are sufficiently spaced apart to be comfortably gripped by two hands. The handle portions may be generally cylindrical with a diameter, by way of example only, of between 10 and 40 mm, and preferably between 15 and 25 mm, and spaced apart by, for example, 50-200 mm. The shears are not designed to be operated using one hand, and generally cannot be operated using only one hand. Once a user has grasped the handle portions 101 when the shears are in an open position, such as that shown in FIG. 1, the user can then push the handle portions 101 towards each other, causing the shears to rotate about the pivot point 111 and causing the inner edges 110 of the cutting portions 103 to approach each other until they are proximate to and engage each other in the closed position as depicted in FIGS. 2 and 3. The inner edges 110 are designed so that when this is done, any plant material between the cutting portions 103 is cut by the inner edges 110 of the cutting portions 103.

The stowed position of the one or more appendage is selected so that the stowed appendage does not interfere with a user's hands when the user is operating the shears or using one of appendages as a garden tool.

Preferably the inner edge 110 of each cutting portion 103 is a sharpened cutting blade. Although it is not preferred, one inner edge may be a cutting blade and the other inner edge an anvil. In any case, when the shears are in the closed position, a portion of the lower surface of the cutting portion 103b is positioned above and close to or abutting a portion of the upper surface of the other cutting portion 103a. Then, the user may pull the two handle portions 101 apart so that the inner edges 110 of the cutting portions 110 become spaced apart from each other again, and the process may then be repeated to cut other material.

The cutting portions 103, define a longitudinal axis 201 that passes through the pivot point 111 and the tips 200 of the cutting portions 103 when the shears are in the closed position as depicted in FIG. 2. In a preferred embodiment, the tips 200 at the distal ends of the cutting portions 103 form an integral weeding tool when the shears are in the closed position. With the shears in the closed position, the tips 200 may be placed near the base of a weed on the surface of the ground, and then the user may put downward pressure on the implement using the handle portions 101 to cause the cutting portions 103 to penetrate the ground near the roots of the weed, and then may apply backward pressure to the handle portions 101 to dig the weed out of the ground. The cutting portions 103 may have stops 107 towards their proximal ends extending away from the longitudinal axis 201, preferably substantially perpendicular to the longitudinal axis 201 when the shears are in the closed position. The user may then apply downward force to the implement 100, to cause the integral weeding tool to penetrate hard ground, by the user placing a foot on one of the stops 107 and exerting downward force.

One or both cutting portions 103 may include a saw blade on its outer edge. The embodiment shown in FIG. 1 has a saw blade 108 on the outer edge of the cutting portion 103b of shear b. The blade is preferably a crosscut saw blade, but could be another type of saw blade. The outer edges of the two cutting portions 103 may both have saw blades, which may be of the same type or different types. When the shears are in the closed position, the central portions 102 of the shears are configured so that they may be grasped by one of the user's hands. The central portions 102 may be suitably contoured, and extend sufficiently along the longitudinal axis 201, such as for 100 mm, so as to provide a comfortable hand grip. The user may then operate the saw when the shears are in the closed position by gripping the central portion 102 and sliding the saw blade 108 back and forth across plant or other material that the user wishes to cut. The stops 107 act as a guard to prevent the user's hand from slipping into contact with the saw blade 108. The implement 100 may also have a catch (not shown) attached to one of the shears and movable so as to engage the other shear when the shears are in the closed position so as to lock the shears in the closed position. This can be useful, for example, when the user is using the saw in order to prevent the shears from separating (i.e. moving away from the closed position into an open position). A catch is useful but not required. For example, the shears may be configured to sufficiently abut each other when the shears are in the closed position so that they frictionally engage each other so that the friction presents significant resistance to opening the shears.

One or both cutting portions 103 may include a knife edge on the outer edge. The embodiment shown in FIG. 1 has a knife edge 109 on the outer edge of the cutting portion 103*a* of shear a. The knife may be used in a similar fashion as described for the saw. The knife may be optimized to act as a slashing instrument, like a machete, for slashing vegetation and other material. In that case, the user may choose to use the machete by gripping one or both of the handle portions 101 in order to get more leverage, preferably when the shears are locked together by the catch, so that the user may then swing the implement 100 in order to strike vegetation with the knife blade 109.

Figure 4:
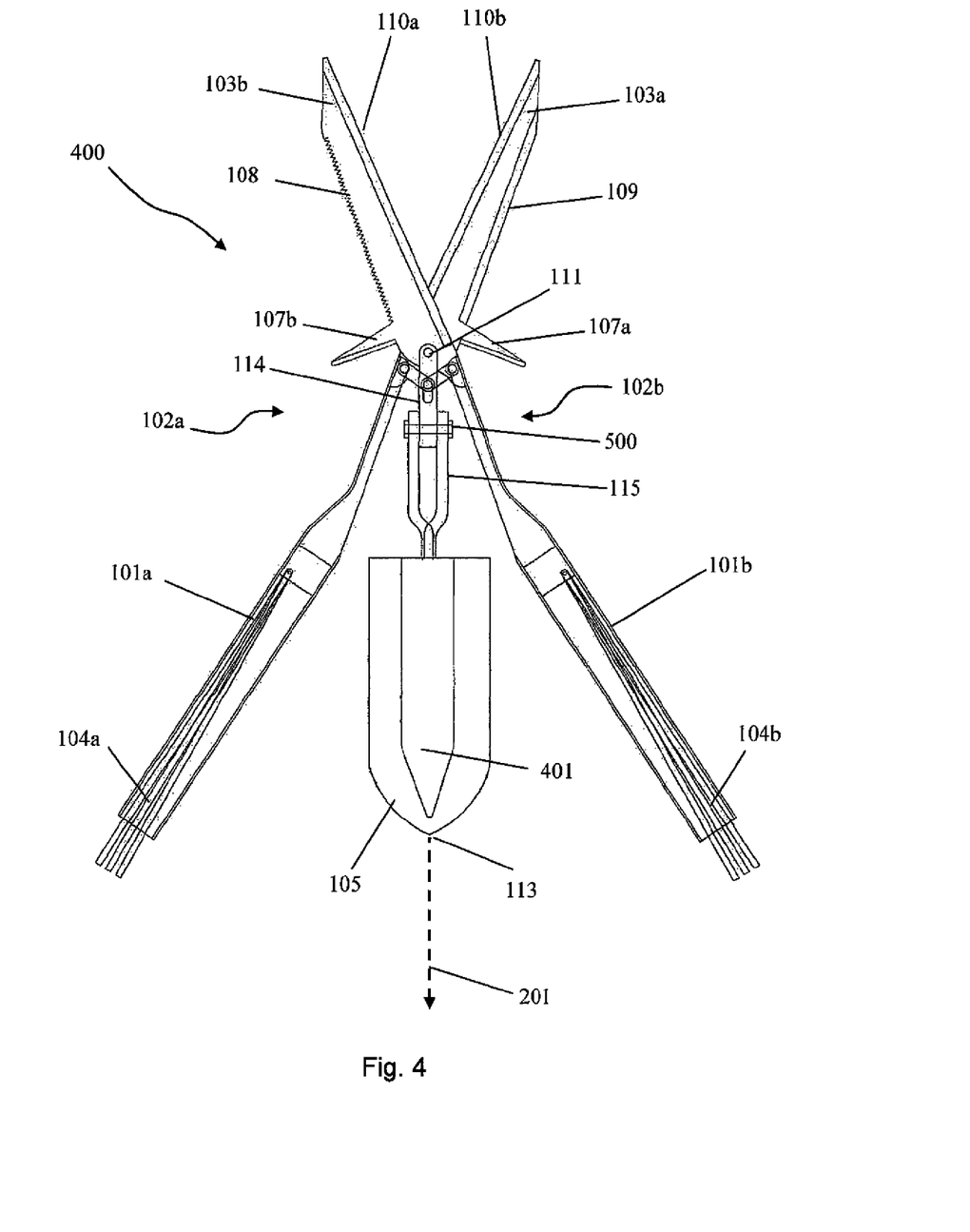
FIG. 4 shows a plan view of a second embodiment a gardening implement with the shears in an open position, the shovel in the stowed position, and the rake components in the stowed position.

The implement 100 further includes at least one appendage. An appendage generally has a longitudinal axis that is substantially aligned with the longitudinal axis 201 of the implement 100 when the appendage is in its operating position. FIG. 4 shows an embodiment 400 of the invention having a single appendage that is a shovel, specifically a spade. The longitudinal axis 201 of the implement 400 extends through the pivot point 111 and the distal end 113 of the spade blade 105. The proximal end of the spade is pivotally attached to the central portion 102 of at least one of the shears. The spade includes a spade blade 105 rigidly connected to the central portions 102 by a tool arm 115. More generally, an appendage has a tool portion, such as a spade blade 105, rigidly attached to a tool arm 115 that attaches to the central portion 102 and rotates about its attachment point 500 that is connected to the central portion 102 so that the appendage is constrained so that its longitudinal axis remains substantially aligned with the longitudinal axis 201 of the implement 400. The appendage can rotate between a stowed position, as shown in FIG. 4 and an operating position.

The attachment point may be close to the pivot point 111 or it may be, for example, a pin 500 that is connected to one or both of the central portions 102 of the shears by an appendage connection arm 114 that is part of one or both of the central portions 102, extending away from the cutting portions 103 along the longitudinal axis 201 of the implement 400. The appendage connection arm 114 may be rigidly connected to the rest of the central portion 102 of either and preferably both shears, such as by a vertical pin passing through the pivot point 111 of the shears.

The implement 100 may be configured so that the pivot point 111 may be near the centre of mass of the implement 100 for improved balance, making it easier for a used to grasp the implement 100 at the central portions 102 and use one of the tools in its operating position.

The appendage may connect to the appendage connection arm 114 at a horizontal pin 500 that permits the appendage to rotate in the plane that passes through the longitudinal axis 201 of the implement 100, 400 and is perpendicular to the surfaces of the cutting portions 103 so the plane comes vertically out of the page in FIG. 4, perpendicular to the page. This form of rotation of the appendage may be referred to as vertical rotation. The longitudinal axes of the first appendage is maintained in a plane normal to the surfaces of the cutting portions 103 that passes through the longitudinal axis 201 of the gardening implement.

Although it is not preferred, the appendage may alternately connect to the appendage arm 114 at a vertical pin (not shown) that permits the appendage to rotate in the plane through the longitudinal axis 201 of the implement 400 and parallel to the surfaces of the cutting portions 103 (so approximately coincident with the page in FIG. 1). This form of rotation of the appendage may be referred to as horizontal rotation. The longitudinal axes of the appendage and of the implement are parallel when the appendage is in the operating position and generally also when the appendage is in the stowed position. During rotation, the axes pass through relative angular positions FIGS. 1-3 and 5-7 show a preferred embodiment of the implement 100 with two appendages, the first being a spade, and the second being a garden cultivator. The tool portion of the cultivator is a claw 106.

Figure 5A:
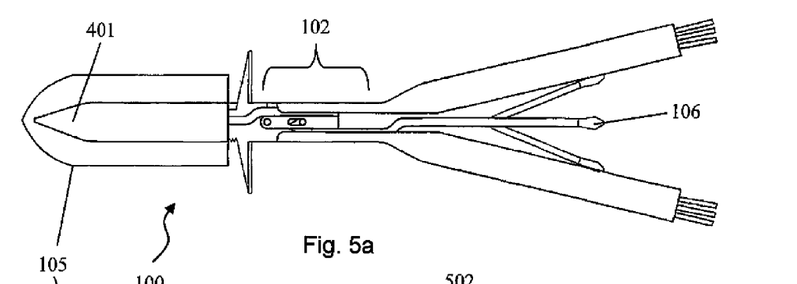
FIG. 5a shows a plan view with the shears in the closed position, the shovel in the operating position, the cultivator in the stowed position, and the rake components in the stowed position.
Figure 5B:
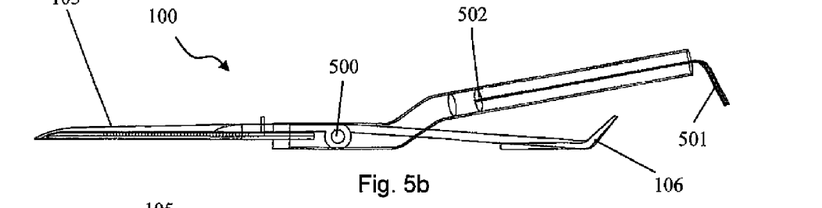
FIG. 5b shows a side view with the shears in the closed position, the shovel in the operating position, the cultivator in the stowed position, and the rake components in the stowed position.
Figure 5C:
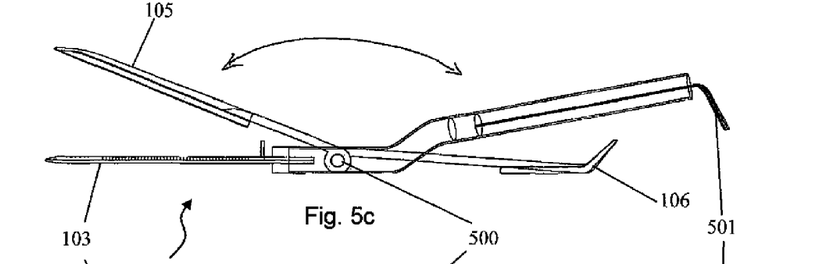
FIG. 5c shows a side view with the shears in the closed position, the shovel in an intermediate position between the operating position and the stowed position, the cultivator in the stowed position, and the rake components in the stowed position.
Figure 5D:
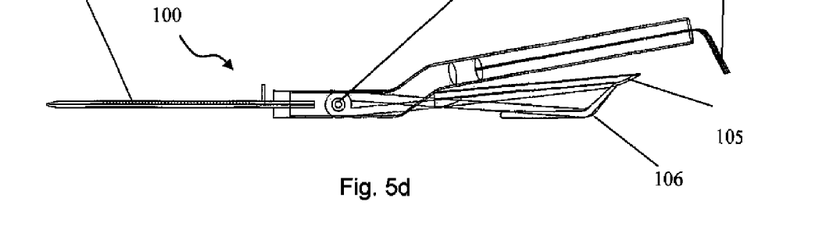
FIG. 5d shows a side view with the shears in the closed position, the shovel in the stowed position, the cultivator in the stowed position, and the rake components in the stowed position.

FIGS. 5*a*-5*d* depict the rotation of the spade between the stowed position, as shown in FIG. 5*d* and the operating position as shown in FIGS. 5*a* and 5*b*. FIG. 5*a* is a top plan view in which implement 100 is in the closed position and the spade blade 105 has been rotated to and locked in the operating position where the spade blade 105 is proximal to the cutting portions 103. The spade blade 105 shown in the figures has a recessed portion 401 having a shape and depth chosen to receive the cutting portions 103 when the shears are in the closed position so that the cutting portions 103 support the spade blade in the operating position while the spade is being used. The cutting portions 103 nest inside the recess 401 when the spade is in the operating position as seen from the side in FIG. 5*b*. The recess 401 may be configured to snap fit to the closed cutting portions 103.

In general, it is preferred that the appendage be locked in the operating position while it is being used as a garden tool by the user. Any suitable locking mechanism may be employed, such as a detent, which can be released by the user after use of the tool. The use of a locking mechanism ensures that the appendage will not unintentionally collapse away from the operating position when high force is being applied to it while it is being operated, which could otherwise cause injury to the user.

When the appendage is in the operating position, and has been unlocked, it may be rotated, as depicted in FIG. 5*c*, about its pivot point 500 while its longitudinal axis generally remains aligned with the longitudinal axis 201 of the implement 100. By aligned, it is meant that the longitudinal axis of the appendage generally remains in a plane normal (perpendicular) to the upper and lower surfaces of the cutting portions 103 and through the longitudinal axis 201 of the implement 100. In this manner, the spade can be rotated from the operating position to the stowed position shown in FIG. 5*d*. The appendage may optionally also be lockable in the stowed position, such as by a detent mechanism.

Figure 6A:
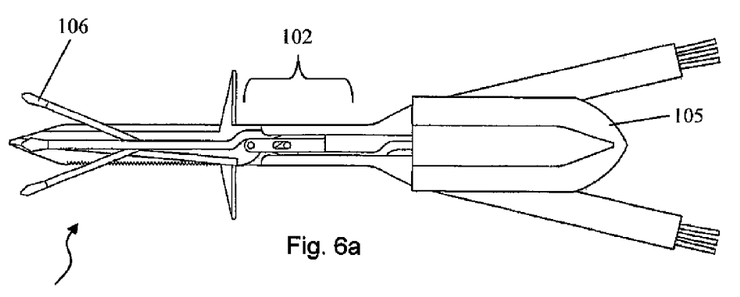
FIG. 6a shows a plan view with the shears in the closed position, the shovel in the stowed position, the cultivator in the operating position, and the rake components in the stowed position.
Figure 6B:
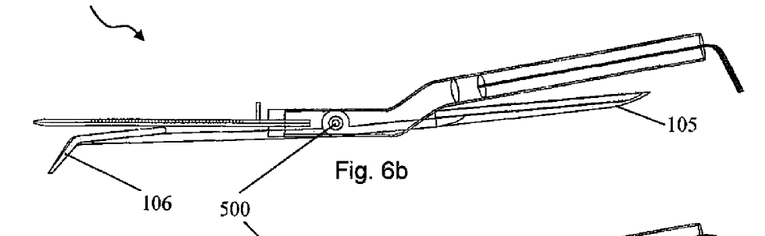
FIG. 6b shows a side view with the shears in the closed position, the shovel in the stowed position, the cultivator in the operating position, and the rake components in the stowed position.
Figure 6C:
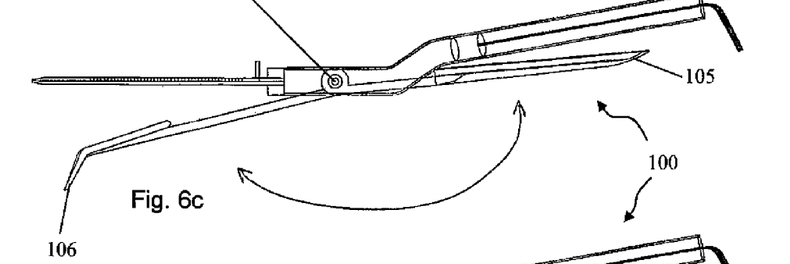
FIG. 6c shows a side view with the shears in the closed position, the shovel in the stowed position, the cultivator in an intermediate position between the operating position and the stowed position, and the rake components in the stowed position.
Figure 6D:
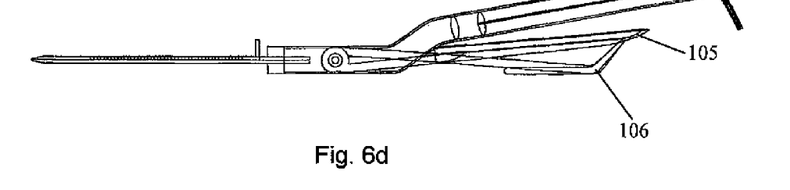
FIG. 6d shows a side view with the shears in the closed position, the shovel in the stowed position, the cultivator in the stowed position, and the rake components in the stowed position.
Figures 7A, 7B:
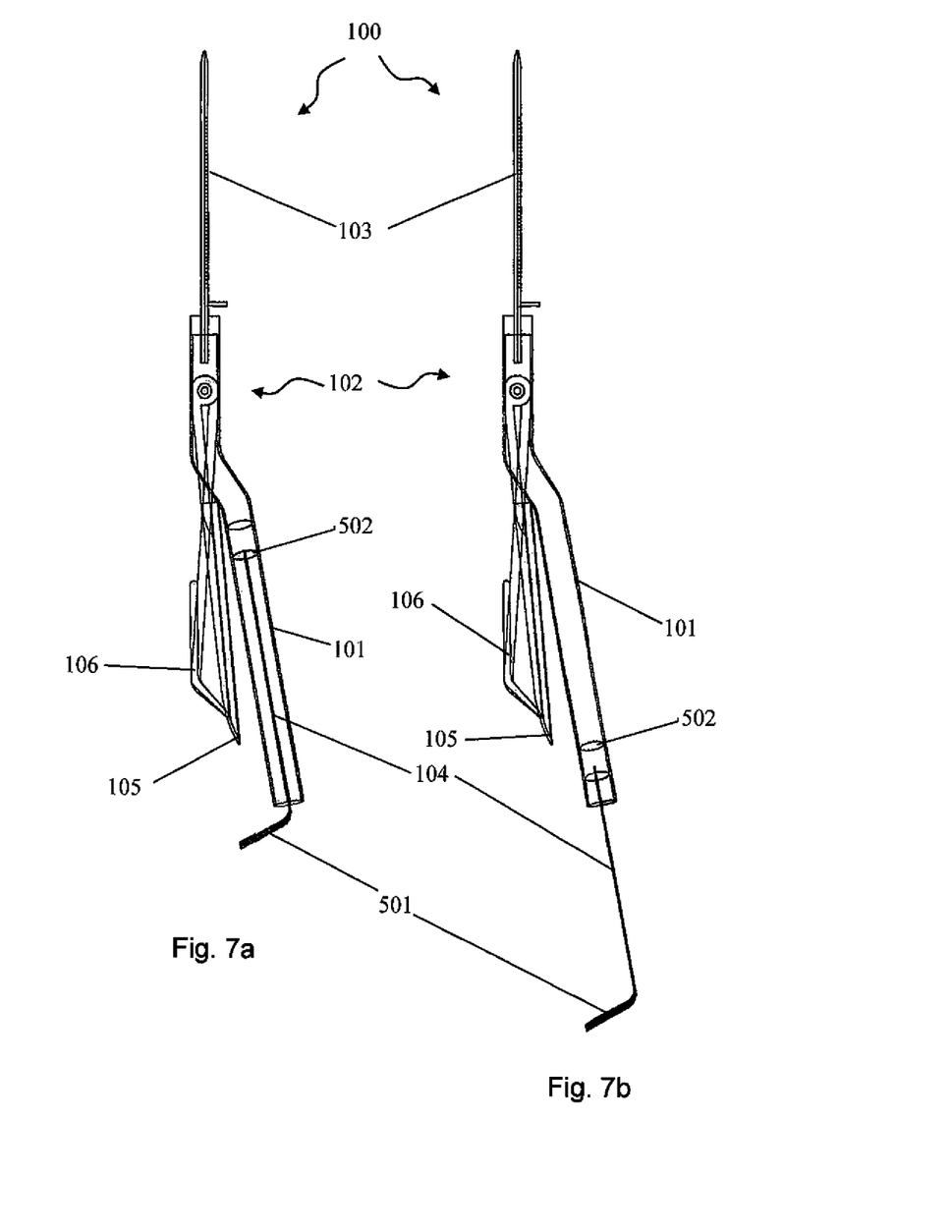
Figure 8:
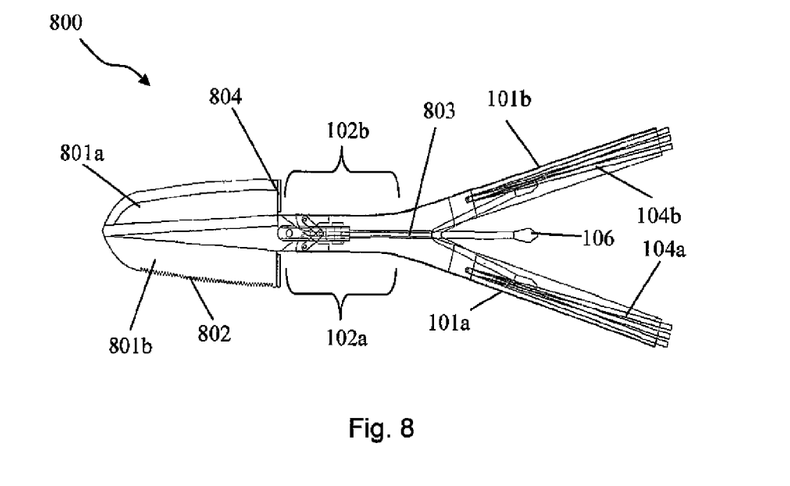
FIG. 8 is a top plan view of a third embodiment of a gardening implement where the cutting portions of the shears extend laterally outwardly from the longitudinal axis to define a spade blade in the closed position, where the handle portions, central portions and cutting portions are depicted as being transparent and the shears are in the closed position.
Figure 9:
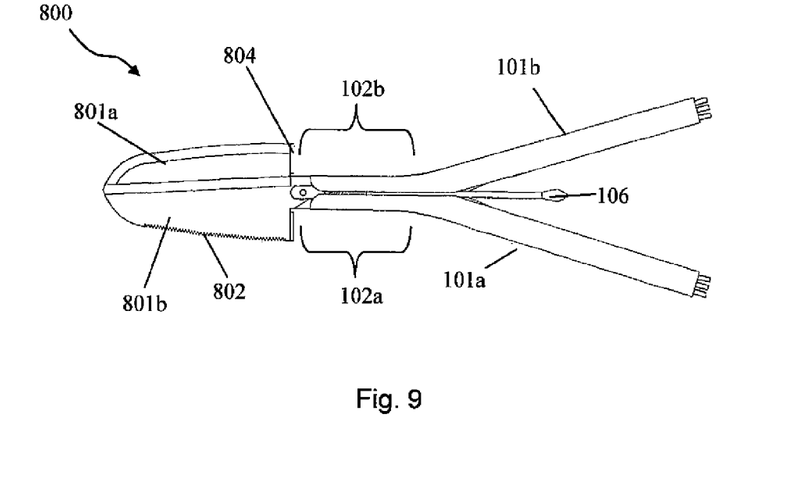
FIG. 9 is a top plan view of the gardening implement of FIG. 8 where the cutting portions of the shears extend laterally outwardly from the longitudinal axis to define a spade blade in the closed position, and the shears are in the closed position.

FIGS. 6*a*-6*d* similarly depict the rotation of the cultivator between the stowed position, as shown in FIG. 6*d* and the operating position as shown in FIGS. 6a and 6b. The cultivator claw 106 rests against and abuts the lower surface of the cutting portions 103 when the shears are in the closed position and the cultivator is in the operating position. The cutting portions 103 thereby provide support to the claw 106 to facilitate its operation, for example providing added rigidity and helping to prevent deformation of the claw when it is being forced into hard soil by the user.

In embodiments with two appendages, one appendage is generally maintained in the stowed position while the other appendage is locked in the operating position, as shown in FIGS. 5a and 5b, where the spade is in the operating position and the cultivator is in the stowed position, and FIGS. 6a and 6b, where the cultivator is in the operating position and the spade is in the stowed position. The two appendages generally rotate in opposite directions around the pivot point 500 (which may be common to both appendages) so that, for example, the spade blade 105 abuts the upper surfaces of the cutting portions 103 when the spade is in the operating position, and the cultivator claw 106 abuts the lower surfaces of the cutting portions 103 when the cultivator is in the operating position.

When an appendage is in the operating position, it may be operated in at least two ways. A user may grasp one or both handle portions 101 and thereby manipulate the appendage, preferably with the shears locked in the closed position. For example, when the spade is in the operating position, the user may position the spade blade adjacent to the ground and then exert downward force to push the spade blade 105 into the ground. Additional force may be generated, for example where the ground is particularly hard, by the user placing the sole of a shoe on one of the stops 107 and pushing the user's foot downward.

Alternatively, the user can grasp the central portions 102 with one hand, which portions are preferably sized and contoured suitably for comfortable hand grasping. The user can then operate the appendage as a hand tool. For example, when the spade is in the operating position and the user grasps the central portions 102, the user can operate the spade like a hand trowel. The stops 107 prevent the user's hand from slipping into contact the spade blade 105 so as to prevent injury. The user's hand pressing against the stops 107 may also permit the user to apply extra force when using the spade. Similarly, when the cultivator is in the operating position, as depicted in FIGS. 6a and 6b, the user can use the cultivator as a hand tool by moving the implement 100 back and forth while the cultivator claw 106 is in contact with the ground or other material.

Alternatively, the user may grasp the central portions 102 with one hand, and then also grasp one of the handle portions 101 with the other hand. Such an approach may facilitate, for example, picking up heaver loads with the spade blade 105.

The depicted cultivator claw 106 has three tines, which is just one example configuration that may be employed as an appendage. The tool portion of an appendage may be, for example, a solid hoe blade so that the implement 100 can be used as a hoe when that appendage is in the operating position.

The appendages may be designed to be removable from the implement 100 and be replaceable. For example, it may be desirable to be able to replace a spade with a worn spade blade 105 with a new spade appendage. Also, having the appendages be interchangeable can allow one implement 100 that is designed for use with two appendages to be used with more than two appendages. For a particular task, the user may need two particular appendages, such as a spade and a hoe so that the user can then pre-configure the implement by attaching a spade appendage and a hoe appendage. For another job, the user may, for example, replace the hoe appendage with a cultivator appendage.

In the preferred embodiments shown in the figures, the implement 100, 400 further includes extendable and retractable rake components 104a, 104b disposed inside the handle portions 101, which have a cavity sized to house the rake components 104. Each depicted rake component 104 has three tines, although the number of tines may vary. For example, two or four or more tines per element could be employed. The rake is shown in the stowed position in FIGS. 1, 3-6 and 7a, and in the operating position in FIGS. 2 and 7b. The rake tines may be connected to an anchor 502 that is slidable within the handle portion 103 between the stowed position and the operating position. The rake preferably locks in the stowed position so that the user can manipulate the implement 100 when the rake is in the stowed position without the tines coming further out from the distal ends 112 of the handle portions 103, and so that the user can pull the end 501 of each rake component 104 and by exerting a relatively light force, can move the rake component 104 out of the locked stowed position and extend the tines so that they extend substantially out from the distal end of the handle portion 103 in the operating position. The rake component may also lock in the operating position, but this is generally not required as the rake is normally operated by dragging it backwards against the ground. As can be seen in FIGS. 5b-5d, 6b-6d and 7, the distal ends 501 of the tines are generally angled downward so that they can be used as a typical rake.

The rake tines are preferably biased so that when they extend out from the handle portion 103 in the operating position, as shown in FIG. 2, the tines separate from each other and are maintained at approximately equal distances from each other. The two rake components 104 are preferably sized and biased so that when both rake components 104 are fully extended and the shears are in the closed position, the inner tine of the two components is separated by a similar distance as the neighbouring tines in each component 104, so that the two combined rake components 104 can cooperate as a single rake in the operating position.

The rake can be operated by the user first moving both rake components 104 into the operating position. After the rake components 104 are in the operating position, and the shears are (preferably locked) in the closed position, the user can operate the rake by grasping the central portions 102 with one hand and then engaging the tines with the ground, moving the implement 100 backwards, lifting it so the tines do not touch the ground and moving it forward, and then repeating as desired.

The spade blade 105 may have ruler markings on it to measure soil depth. Alternatively, ruler markings may be provided on the shears.

Various materials may be used to form the components of the implement 100, as would be evident to a skilled person. The cutting portions 103 are generally made of carbon steel or stainless steel. The tool portions of the appendages and the rake tines are preferably made from metal, such as stainless steel, although they may also be formed from suitable rigid plastics. The central portions 102 are generally also formed from metal, such as stainless steel. The hand portions 101 may be formed from metal, wood, rigid plastic or other suitable materials.

Figure 10:
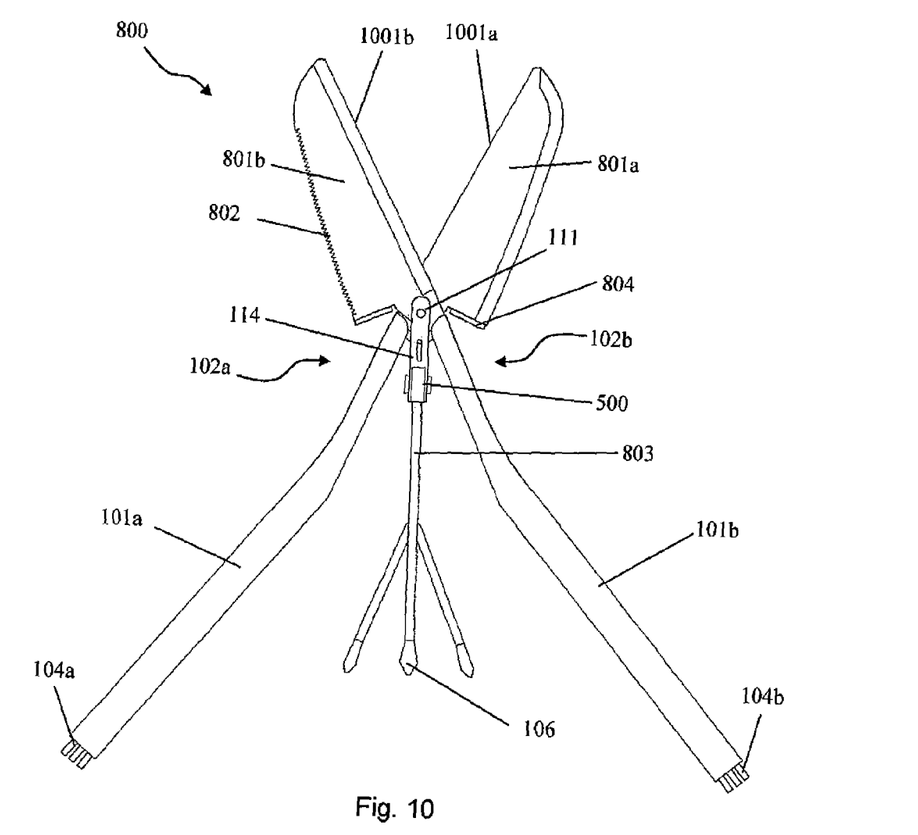
FIG. 10 is a bottom plan view of the gardening implement of FIG. 8 with the shears in an open position.
Figure 11:
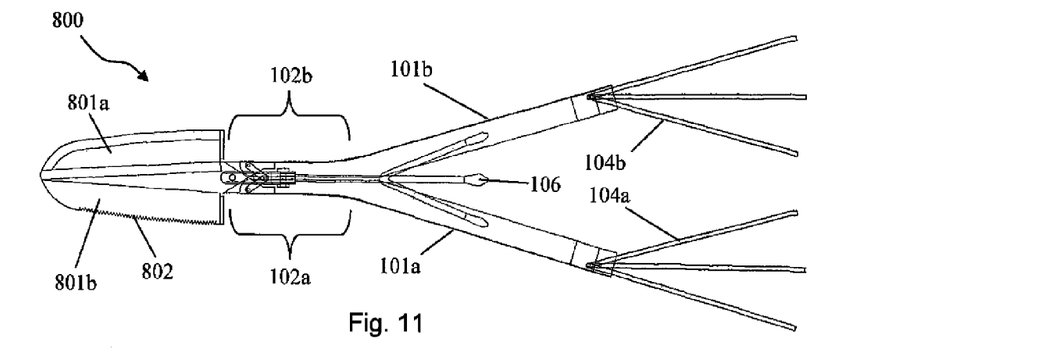
FIG. 11 is a bottom plan view of the gardening implement of FIG. 8 with the shears in the closed position and the rake components in the operating position.
Figures 12A, 12B, 12C:
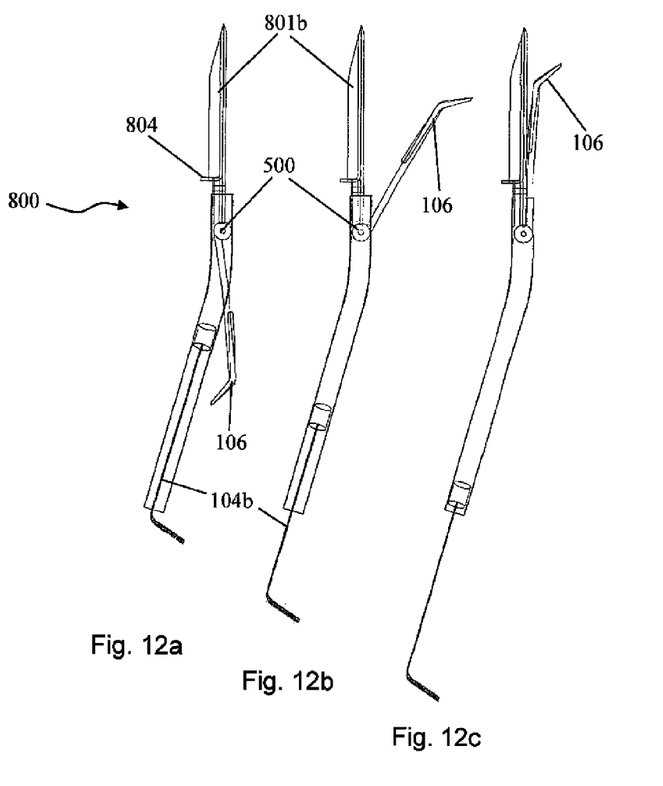
FIG. 12a shows a side view with the shears in the closed position, the cultivator in the stowed position, and the rake components in the stowed position.
FIG. 12b shows a side view with the shears in the closed position, the cultivator in an intermediate position between the operating position and the stowed position, and the rake components in an intermediate position between the operating position and the stowed position.
FIG. 12c shows a side view with the shears in the closed position, the cultivator in the operating position, and the rake components in the operating position.
Figure 13:
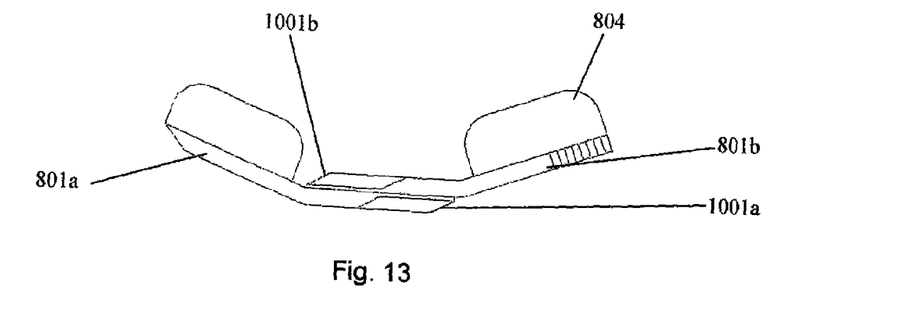
FIG. 13 shows an end view of the cutting portions of the gardening implement of FIG. 8 in a closed position.

Another preferred embodiment being multi-functional gardening implement 800 is depicted in FIGS. 8-12. Note that, for convenience, the corresponding elements of this embodiment are marked in the figures with the same item numbers as in the above-described embodiments. In this embodiment, the cutting portions 801 of the shears are configured to define a spade blade when the shears are in the closed position, as can be seen in the top views in FIGS. 8 and 9 and the side views in FIGS. 12a-12c. The cutting portions 801 of the shears extend laterally outwardly from the longitudinal axis to define a spade blade in the closed position. The inner edge 1001 of each cutting portion 801 is spaced outwardly from the longitudinal axis when in the open position, as shown in FIG. 10, and the inner edges 1001 are in abutting relation adjacent the longitudinal axis when the shears are in the closed position, as depicted in FIG. 13.

The upper surfaces of the cutting portions are generally curved or bent so that in the closed position they define a concave combined surface that performs as a spade or shovel blade. In the depicted embodiment, as shown most clearly in the end view of the cutting portions 801 in FIG. 13, an inner portion of each cutting portion 801 is relatively flat, corresponding to the extent of the overlap of the two cutting portions 801 when the shears are in the closed position. In this embodiment, an outer portion of each cutting portion 801 is bent upward at an angle, such as about 15 degrees, to create a generally concave inner surface, with the outer edges above the inner portions and inner edges 1001 of the cutting portions 801 so as to form a spade blade. Rather than being bent, the outer portions could alternatively be smoothly curved so that the outer edges are above the inner portions and inner edges of the cutting portions so as to form a spade blade.

Preferably the cutting portion 801 of each shear has a lateral width of at least 30 mm, and preferably more than 40 mm, although different widths may be employed, such as 25-50 mm per shear to define a narrow spade blade, or 75-100 mm per shear to define a relatively wide spade blade. The length of the cutting portions 801 may also vary, such as between 100 mm and 200 mm, but other lengths are also possible.

When the shears are in the closed position, the spade may be used by the user grasping either handle 101 in one hand, or by grasping one handle 101a in a first hand and the other handle 101b in the other hand. Alternatively, the spade may be operated by grasping the central portion 102 of the shears in one hand, so that the spade functions like a hand trowel. The laterally extended rear portions 804 of the cutting portions 801 prevent the user's hand from slipping into contact the outer edges of the spade blade so as to prevent injury. The rear faces of the extended rear portions 804 are not sharp and extend in the direction coming out of the page in the figures (perpendicular to both the longitudinal and lateral axes) by an amount at least equal to the thickness of the spade blade, which may be, for example, 3-6 mm. The thickness of each extended rear portion 804 (in the direction perpendicular to the surface of the outer portion) may be greater than the blade thickness, as can be seen in FIGS. 12 and 13. For example their thickness may be about 5-10 mm or greater. In the embodiment shown in FIG. 13, extended rear portions 804 are extend substantially in the direction perpendicular to the surface of the outer portion beyond the surfaces of the cutting portions.

Such an extended rear portion 804 can be used to apply pressure using a foot, as with a typical shovel or spade. The user's hand pressing against the rear portions 804 may also permit the user to apply extra force when using the integral spade while gripping the central portions 102 with one hand. Similarly, when the cultivator or rake are in the operating position, as depicted in FIG. 12c, the user can use the cultivator or rake as a hand tool by moving the implement 800 back and forth while the cultivator claw 106 or rake tines are in contact with the ground or other material.

The gardening implement 800 may include a locking mechanism, such as a catch, that permits the user to lock the shears in the closed position for use of the cutting portions as a spade or shovel. The shears can later be unlocked so that the shears can open and then be used for cutting material placed between the inner edges 1001 of the cutting portions 801. Preferably, the inner edges 1001 are sharpened, or, less preferably, the inner edge of one of the cutting portions is a cutting blade and the inner edge of the other cutting portion is an anvil. As with embodiments 100 and 400 discussed above, one or both outer edges of the cutting portions may be a saw blade 802, or a knife blade.

The multi-functional gardening implement having cutting surfaces configured to form an integral spade blade in the closed position may further include one or more appendages, similar to those in the above-described embodiments, although the inclusion of any appendages is not essential. An appendage generally has a longitudinal axis that is substantially aligned with the longitudinal axis of the implement 800 when the appendage is in its operating position. FIGS. 8-12 shows an embodiment 800 of the invention having a single appendage that is a garden cultivator. The tool portion of the cultivator is a claw 106.

The longitudinal axis of the implement 800 extends through the pivot point 111 (shown in FIG. 10) and parallel to the inner edges 1001 of the cutting portions 801 of the shears when the shears are in the closed position. The proximal end of the garden cultivator is pivotally attached to the central portion 102 of at least one, and preferably both, of the shears. The garden cultivator includes a claw 106 rigidly connected to the central portions 102 by a tool arm 803. More generally, an appendage has a tool portion, such as a claw 106 or hoe, rigidly attached to a tool arm that attaches to the central portion 102 and rotates about its attachment point 500 that is connected to the central portion 102 so that the appendage is constrained so that its longitudinal axis remains substantially aligned with the longitudinal axis of the implement 800. The appendage can rotate between a stowed position, as shown in FIG. 12a and an operating position as shown in FIG. 12c, generally maintaining the alignment of the appendage's longitudinal axis with the longitudinal axis of the implement 800 as the appendage rotates vertically though intermediate positions, such as that shown in FIG. 12b.

The appendage of the implement 800 may be configured and generally operated in the same manner as described above in respect of embodiments 100 and 400. The implement 800 may further have a second appendage, similarly as described above in respect of embodiments 100.

As with embodiments 100 and 400, when an appendage is in the operating position, it may be operated in at least two ways. A user may grasp one or both handle portions 101 and thereby manipulate the appendage, preferably with the shears locked in the closed position. Alternatively, a user may grasp the central portion 102 with one hand. The user may optionally grasp one of the handles 101 with one hand while grasping the central portion 102 with the other hand.

The depicted cultivator claw 106 has three tines, which is just one example configuration that may be employed as an appendage. The tool portion of an appendage may be, for example, a solid hoe blade so that the implement 800 can be used as a hoe when that appendage is in the operating position.

As with embodiments 100 and 400, the appendages may be designed to be removable from the implement 100 and be replaceable.

In the preferred embodiments shown in FIGS. 8-12, the implement 800 further includes extendable and retractable rake components 104a, 104b disposed inside the handle portions 101, which have a cavity sized to house the rake components 104. These may be configured and operate similarly to the rake described above as part of embodiments 100 and 200. The rake tines are preferably biased so that when they extend out from the handle portion 103 in the operating position, as shown in FIG. 11.

Rather than having rake components disposed in one or both handles, embodiments of the invention may alternatively have a cultivator tool attached so that the arm of the cultivator disposed in one of the handles and the claws extends out from the distal end of the handle, the cultivator being slideably attached within the handle so that it can be moved from a stowed position, in which the arm is substantially inside the handle and only the claw is visible, and an operating position in which the arm is pulled out from and extends out from the handle. Preferably such a cultivator is releasably lockable in both the stowed and operating positions, which can be done by using well known mechanisms.

It should be noted that the use of the term "spade" is not intended to limit embodiments to any particular shape. While a spade is generally considered to have a flat bottom edge for use as a digging tool, embodiments with other shapes corresponding to known forms of shovel blades may alternately be employed.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A multi-functional gardening implement extending along a longitudinal axis comprising two opposed shears, each shear comprising a cutting portion, a handle portion and a central portion therebetween, the handle portions and cutting portions of each shear extending pivotably outwardly from the central portion, the cutting portions having opposed inwardly facing inner edges pivoting between a closed position in abutting relation and an open position in spaced apart relation, and the cutting portions being configured to define a spade blade in the closed position.

2. The multi-functional gardening implement as claimed in claim 1 wherein the cutting portions extend laterally outwardly from the longitudinal axis to define a spade blade in the closed position, each inner edge being spaced outwardly from the longitudinal axis when in the open position and the inner edges being in abutting relation adjacent the longitudinal axis when in the closed position.

3. The gardening implement of claim 1, wherein each cutting portion has a relatively flat inner portion, which inner portions overlap and abut each other in the closed position, and an outer portion that is bent or curved upward so that an outer edge of the cutting portion is above the flat inner portion so that the cutting portions define a spade blade in the closed position.

4. The gardening implement of claim 1, further comprising a first appendage having a longitudinal axis, a proximal end pivotally attached to the central portion of at least one of the shears and a distal end, a portion of the first appendage towards the distal end comprising a first gardening tool, the first appendage being rotatable between an operating position in which the first gardening tool is proximate to the cutting portions of the shears in the closed position, and a stowed position in which the first gardening tool is spaced apart from the cutting portions.

5. The gardening implement of claim 4, wherein the longitudinal axis of the gardening implement is substantially aligned with the longitudinal axis of the first appendage when the cutting portions are in the closed position and the first appendage is in the operating position.

6. The gardening implement of claim 5, wherein the first appendage is constrained to rotate vertically so that the longitudinal axis of the first appendage is maintained in a plane normal to the surfaces of the cutting portions near the inner edges in the closed position, the plane passing through the longitudinal axis of the gardening implement.

7. The gardening implement of claim 1, wherein the handle portions of the shears are sized and spaced apart from each other so the shears are operable by a user gripping one handle portion with one hand and gripping the other handle portion with the user's other hand.

8. The gardening implement of claim 4, wherein the first gardening tool is a hoe blade.

9. The gardening implement of claim 4, wherein the first gardening tool is a garden cultivator claw.

10. The gardening implement of claim 4, further comprising a second appendage having a longitudinal axis, a proximal end pivotally attached to the central portion of at least one of the shears, and a distal end, a portion of the second appendage towards the distal end comprising a second gardening tool, the second appendage being rotatable between an operating position in which the second gardening tool is proximate to the cutting portions of the shears in the closed position, and a stowed position in which the second gardening tool is spaced apart from the cutting portions.

11. The gardening implement of claim 1, further comprising a rake component disposed inside the handle portion of one of the shears, the rake component comprising a plurality of tines and being slidable from a stowed position, in which the rake component is maintained substantially inside the handle portion, to an operating position in which the tines extend out from distal ends of the handle portions opposite to the portions of the handles proximate to the central portion.

12. The gardening implement of claim 11, wherein the tines are biased to separate from each other when the rake component is in the operating position so that when the rake component is in the operating position, the gardening implement is operable as a rake with a handle corresponding to the central portions of the shears.

13. The gardening implement of claim 1, wherein each cutting portion has an outer edge, and the outer edge of the cutting portion of one of the shears comprises a saw blade.

14. The gardening implement of claim 1, wherein each cutting portion has an outer edge, and the outer edge of the cutting portion of one of the shears comprises a knife blade.

15. The gardening implement of claim 1, wherein the central portions of the shears are contoured to serve as a hand grip when the cutting portions are in the closed position.

16. The gardening implement of claim 4, wherein when the cutting portions are in the closed position and the first appendage is in the operating position, the first gardening tool abuts either the upper surfaces or the lower surfaces of the cutting portions so that the cutting portions provide support to the first gardening tool.

17. The gardening implement of claim 4, wherein the first appendage is removable from the gardening implement so that the first appendage can be removed and replaced with another appendage.

18. A multi-functional gardening implement extending along a longitudinal axis, the implement comprising a pair of garden shears comprising a pair of pivotably opposed shear blades, each blade extending from a corresponding shear handle, the garden shears extending along the longitudinal axis, the shear blades extending toward a distal end of the longitudinal axis, and each shear handle extending toward a proximate end of the longitudinal axis, the shear blades being laterally extended and shaped to form a spade blade when the shear blades are in a closed abutting position.

19. The multi-functional gardening implement claimed in claim 18, further comprising a plurality of gardening tools operatively connected with the garden shears along the longitudinal axis, each gardening tool moving between (i) a stowed position to inhibit interference with the operational use of the garden shears or another gardening tool within said plurality of gardening tools, and (ii) an extended position along the longitudinal axis for operational use of the gardening tool, wherein a first gardening tool abuts against the garden shears to inhibit deflection of the first gardening tool during operational use in its extended position.

20. The multi-functional gardening implement claimed in claim 19, wherein the first gardening tool is selected from the group of gardening tools consisting of a hoe, a cultivator, a weeder, and a rake.

* * * * *